US006985465B2

(12) United States Patent
Cervello et al.

(10) Patent No.: US 6,985,465 B2
(45) Date of Patent: Jan. 10, 2006

(54) DYNAMIC CHANNEL SELECTION SCHEME FOR IEEE 802.11 WLANS

(75) Inventors: Gerard G Cervello, Barcelona (ES); Sunghyun Choi, Montvale, NJ (US); Stefan Mangold, Aadren (DE); Amjad Ali Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 798 days.

(21) Appl. No.: 09/901,871

(22) Filed: Jul. 9, 2001

(65) Prior Publication Data

US 2002/0060995 A1    May 23, 2002

Related U.S. Application Data

(60) Provisional application No. 60/233,179, filed on Sep. 15, 2000, provisional application No. 60/217,145, filed on Jul. 7, 2000.

(51) Int. Cl.
*H04Q 7/00* (2006.01)

(52) U.S. Cl. ....................... 370/333; 370/329
(58) Field of Classification Search ............. 370/328, 370/329, 330, 331, 332, 333, 338, 468
See application file for complete search history.

(56) References Cited

U.S. PATENT DOCUMENTS 6,108,321 A * 8/2000 Anderson et al. ......... 370/329

| 6,295,285 | B1 * | 9/2001 | Whitehead ................ 370/329 |
| 6,442,157 | B1 * | 8/2002 | Carter et al. ............. 370/347 |
| 6,449,462 | B1 * | 9/2002 | Gunnarsson et al. ..... 455/67.13 |
| 6,580,704 | B1 * | 6/2003 | Wellig et al. ............. 370/338 |

FOREIGN PATENT DOCUMENTS

| EP | 1063819 A1 | 6/1999 |
| WO | WO0137463 | 11/2000 |

OTHER PUBLICATIONS

"Broadband Radio Access Networks (BRAN); Hiperlan Type 2; System Overview", ETSI TR 101 683 VI. 1.1, XX, XX, Feb. 8, 2000, pp. 1-20, XP002176358.

* cited by examiner

*Primary Examiner*—Duc Ho
*Assistant Examiner*—Thien D. Tran (57) ABSTRACT

Disclosed is a method and system for dynamically selecting a communication channel between an access point (AP) and a plurality of stations (STAs) in an IEEE 802.11 wireless local area network (WLAN). The method includes the steps of: determining whether a new channel between the AP and STAs within a particular basic service set (BSS) is needed; requesting a channel signal quality measure to some of the plurality of stations by the AP; reporting a channel signal quality report back to the AP based on a received signal strength indication (RSSI) and a packet error rate (PER) of all channels detected by the stations within the BSS; selecting a new channel based on the channel quality report for use in communication between the AP and the plurality of stations.

16 Claims, 10 Drawing Sheets

MLME-SCAN.request (
    BSSType,
    BSSID,
    SSID,
    ScanType,
    ProbeDelay,
    ChannelList,
    MinChannelTime,
    MaxChannelTime
)

| NAME | TYPE | VALID RANGE | DESCRIPTION |
|---|---|---|---|
| BSSType | ENUMERATION | INFRASTRUCTURE, INDEPENDENT, ANY_BSS | DETERMINES WHETHER INFRA-STRUCTURE BSS, INDEPENDENT BSS, OR BOTH, ARE INCLUDED IN THE SCAN |
| BSSID | MACAddress | ANY VALID INDIVIDUAL OR BROADCAST MAC ADDRESS | IDENTIFIES A SPECIFIC OR BROADCAST BSSID |
| SSID | Octet string | 0-32 octets | SPECIFIES THE DESIRED SSID OR THE BROADCAST SSID |
| ScanType | Enumeration | ACTIVE, PASSIVE | INDICATES EITHER ACTIVE OR PASSIVE SCANNING |
| ProbeDelay | Integer | N/A | DELAY (IN $\mu S$) TO BE USED PRIOR TO TRANSMITTING A PROBE FRAME DURING ACTIVE SCANNING |
| ChannelList | Ordered set of integers | EACH CHANNEL WILL BE SELECTED FROM THE VALID CHANNEL RANGE FOR THE APPROPRIATE PHY AND CARRIER SET. | SPECIFIES A LIST OF CHANNELS THAT ARE EXAMINED WHEN SCANNING FOR A BSS |
| MinChannelTime | Integer | $\geq$ ProbeDelay | THE MINIMUM TIME (IN TU) TO SPEND ON EACH CHANNEL WHEN SCANNING |
| MaxChannelTime | Integer | $\geq$ MinChannelTime | THE MAXIMUM TIME (IN TU) TO SPEND ON EACH CHANNEL WHEN SCANNING |

| OCTETS: 1 | 1 | 1 | 1 | 1 – n |
|---|---|---|---|---|
| ELEMENT ID (33 OR ANY) | LENGTH (3 – n+2) | ACTIVATION DELAY | MEASUREMENT DURATION | CHANNEL NUMBERS |

BASIC CHANNEL MEASUREMENT METHOD INFORMATION ELEMENT FORMAT

FIG. 5(a)

| OCTETS: 1 | 1 | 1 | 1 | 1 | 1 | 1 – n |
|---|---|---|---|---|---|---|
| ELEMENT ID (34) | LENGTH (5 – n+4) | ACTIVATION DELAY | MEASUREMENT DURATION | MEASUREMENT OFFSET | NON-MEASUREMENT DURATION | CHANNEL NUMBERS |

CF CHANNEL MEASUREMENT METHOD INFORMATION ELEMENT FORMAT

| OCTETS: 1 | 1 | 1 | 1 |
|---|---|---|---|
| ELEMENT ID (35 OR ANY) | LENGTH (0 – 8*n) | CHANNEL NUMBER 1 | MEASUREMENT SUMMARY |

| OCTETS: 2 | 2 | 1 | 1 |
|---|---|---|---|
| NUMBER OF FRAMES RECEIVED | NUMBER OF FRAMES RECEIVED IN ERROR | CCA BUSY FRACTION | NUMBER OF CCA BUSY FRACTION WITHOUT FRAME RECEPTION |

| ... |
|---|

FIG. 7(a)

| BITS: 1 | 1 | 1 | 5 |
|---|---|---|---|
| BSS | CF | BEACON | RESERVED |

FIG. 7(b)

| OCTETS: 1 | 1 | 1 | 1 |
|---|---|---|---|
| ELEMENT ID (32 OR ELSE) | LENGTH (2) | CHANNEL TO SWITCH | CHANNEL SWITCH COUNT |

CHANNEL SWITCH ANNOUNCEMENT IN INFORMATION ELEMENT FORMAT

FIG. 8

DYNAMIC CHANNEL SELECTION SCHEME FOR IEEE 802.11 WLANS

CROSS REFERENCE TO RELATED APPLICATIONS

This application claims the benefit of U.S. Provisional Applications Ser. No. 60/217,145 filed Jul. 7, 2000 and Ser. No. 60/233,179 filed on Sep. 15, 2000, the teachings of which are incorporated herein by reference.

BACKGROUND OF THE INVENTION

1. Field of the Invention

The present invention relates to a dynamic channel selection (DCS) method in an IEEE 802.11 wireless local area network (WLAN) in which a plurality of wireless channels are used by a plurality of wireless stations in communication with an access point (AP), wherein each channel is selected dynamically according to channel determination made by the access point (AP).

2. Description of the Invention

Basically, there are two variants of wireless local area networks (WLAN): infrastructure-based and ad hoc-type. In the former network, communication typically takes place only between the wireless nodes, called stations ($STA_i$), and the access point (AP), not directly between the wireless nodes as in the latter network. Thus, the wireless nodes can exchange data via the AP. The stations and the AP, which are within the same radio coverage, are known as a basic service set (BSS).

When two adjacent basic service sets (BSSs) are located close to each other and operate at the same channel, which are referred to as overlapping BSSs, it is difficult to support the required quality-of-service (Qos) due to the possible contentions between the overlapping BSSs. It is not always possible to avoid contentions by planning channel allocations to BSSs carefully before the WLAN deployment, especially in the home/office environment where other WLAN devices are operating independently in the vicinity, e.g., in the neighboring houses or offices. Currently, IEEE 802.11 does not provide a mechanism to address this type of contention.

Accordingly, there is a need for a dynamic channel selection (DCS) scheme enabling the access point (AP) to select a channel for all stations (STAs) associated with its basic service set (BSS), without requiring any changes in the physical layer (PHY) specification of IEEE 802.11 WLAN.

SUMMARY OF THE INVENTION

The present invention is directed to a dynamic channel selection method in an IEEE 802.11 wireless local area network (WLAN), wherein each channel is selected dynamically according to the criteria determined by the access point (AP).

Accordingly, the method of dynamically selecting a communication channel between an access point (AP) and a plurality of stations (STAs) located within the coverage area of a basic service set (BSS) is initially performed by determining whether a new channel to be used by the plurality of wireless stations is needed, then by requesting a channel signal quality measure to a subset of stations by the AP. To achieve this process, a set of channels available for use by the stations is determined to find out whether a signal from an adjacent BSS is received or if there are other interfering devices. The received signal strength indication (RSSI) and a packet error rate (PER) of all the channels that are measured by the stations are reported to the AP. Also, an interference level is measured. The interference level is based on the absence of a signal reception from the BSS for a predetermined time period that is caused by another communication system and is measured and reported. Thereafter, a new channel based on the decision criteria of the AP is selected using the measure of RSSI, PER, and the interference level information.

The foregoing and other features and advantages of the invention will be apparent from the following, more detailed description of preferred embodiments as illustrated in the accompanying drawings in which reference characters refer to the same parts throughout the various views.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

The IEEE 802.11 standard specifies the medium access control (MAC) and the physical (PHY) characteristics for wireless local area networks. The IEEE 802.11 standard is defined in International Standard ISO/IEC 8802-111, "Information Technology—Telecommunications and information exchange area networks", 1999 Edition, which is hereby incorporated by reference in its entirety. The available number of non-overlapping or orthogonal channels for IEEE 802.11 WLAN systems depends on the underlying PHY layer. For example, the 802.11 Direct-Sequence Spread-Spectrum (DSSS) and 802.11b Complementary Code Keying (CCK) PHYs have three non-overlapping channels at 2.4 GHz. The 802.11a PHY has up to 12 channels at 5 GHz. The key principle of the present invention is to provide a dynamic channel selection (DCS) scheme enabling an access point (AP) to select a channel for all stations (STAs) associated with its basic service set (BSS), without requiring any changes in the physical layer (PHY) specification of IEEE 802.11 WLAN.

Figure 1A:
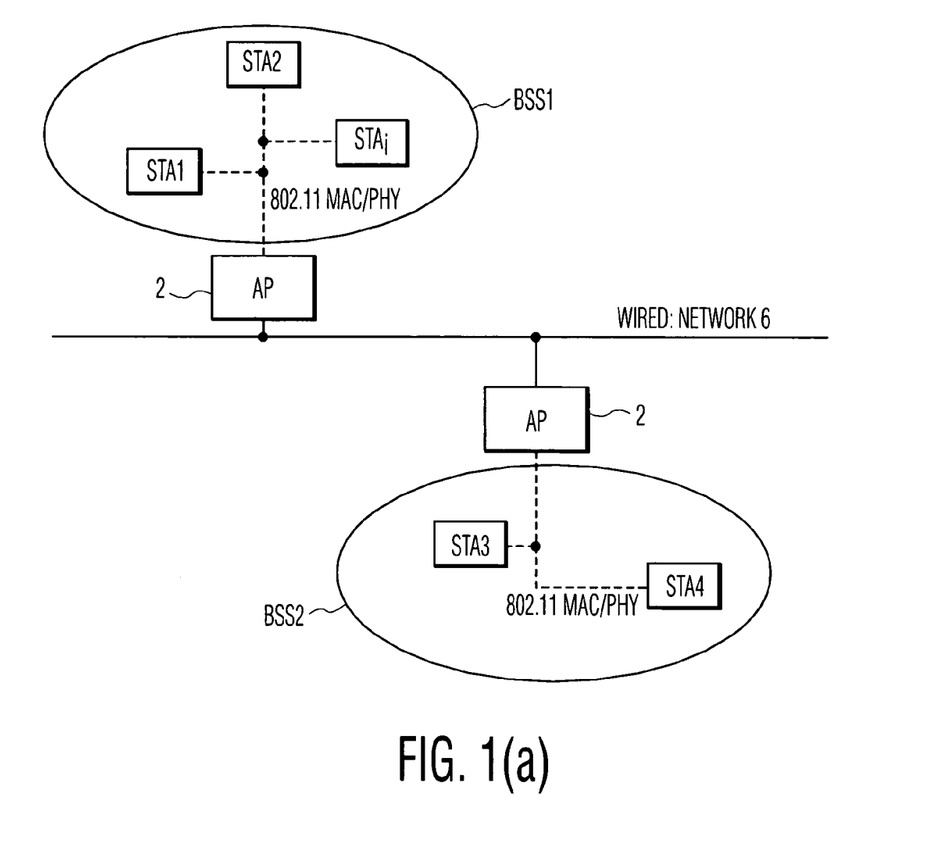
FIG. 1(a) is a simplified block diagram illustrating the architecture of a wireless communication system whereto embodiments of the present invention are to be applied.

FIG. 1(a) is a block diagram illustrating the IEEE 802.11 architecture of a wireless communication system whereto embodiments of the present invention are to be applied. As shown in FIG. 1(a), an access point (AP) 2 coupled to a wired or wireless network 6 and a plurality of mobile stations (STA$_i$) coupled to the respective AP 2 through a wireless link are communicating with each other via a plurality of wireless channels. The mobile stations and the AP that are within the same radio coverage area are known as a basic service set (BSS). The stations STA$_i$ within a BSS can exchange data with each other via the access point (AP) 2. The main functions of the AP are to direct the traffic, provide access to other networks, support roaming (e.g., changing access points), synchronization within a BSS, support power management, and control the medium access to support time-bound service within a BSS.

Figure 1B:
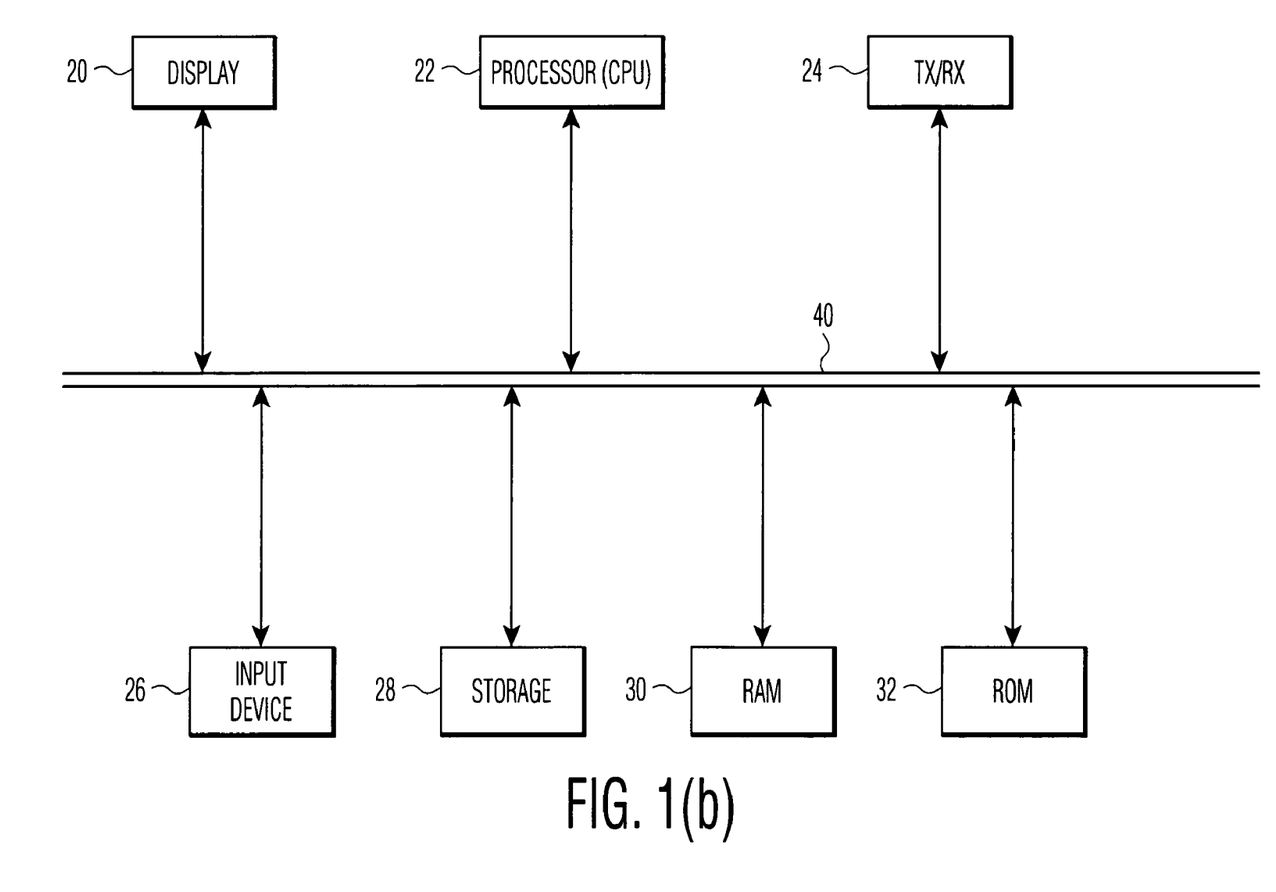
FIG. 1(b) is a simplified block diagram illustrating the end systems suitable for use within a WLAN.

The AP and each STA within the WLAN of FIG. 1(b) may include a system with an architecture illustrated in the block diagram of FIG. 1(b). Both the AP and STA may include a display 20, a CPU 22, a transmitter/receiver 24, an input device 26, a storage module 28, a random access memory (RAM) 30, a read-only memory (32), and, a common bus 40. The exemplary computer system 11 of FIG. 1(b) is for descriptive purposes only. Although the description may refer to terms commonly used in describing particular computer systems, the description and concepts equally apply to other processing systems, including systems having architectures dissimilar to that shown in FIG. 1(b). The transmitter/receiver 24 is coupled to an antenna (not shown) to transmit desired data and its receiver converts received signals into corresponding digital data. The CPU 22 operates under the control of an operating system contained in the ROM 32 and utilizes RAM 30. The CPU 22 operation relating to frequency selection within a wireless local area network (WLAN) by enabling the AP to provide a new wireless link for all stations (STAs) associated with its BSS. For example, a subset of the STAs of a BSS may be in an overlapping region with a neighboring BSS, thus experiencing contentions from the STAs in the neighboring BSS.

Figure 2A:
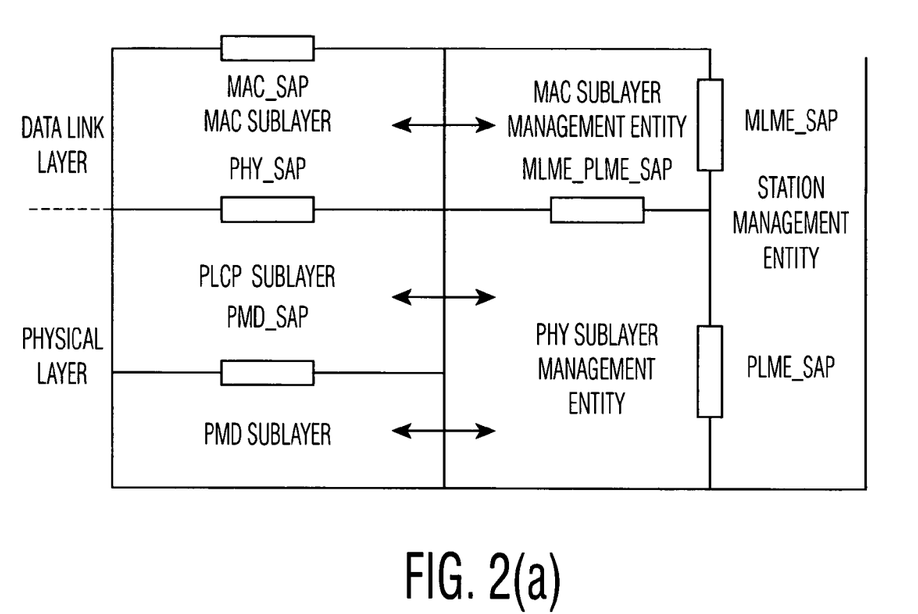
FIG. 2(a) depicts an architectural view of the medium access control (MAC) of the data link layer and the PHY layer according to the IEEE 802.11IEEE 802.11 standard.
Figure 2B:
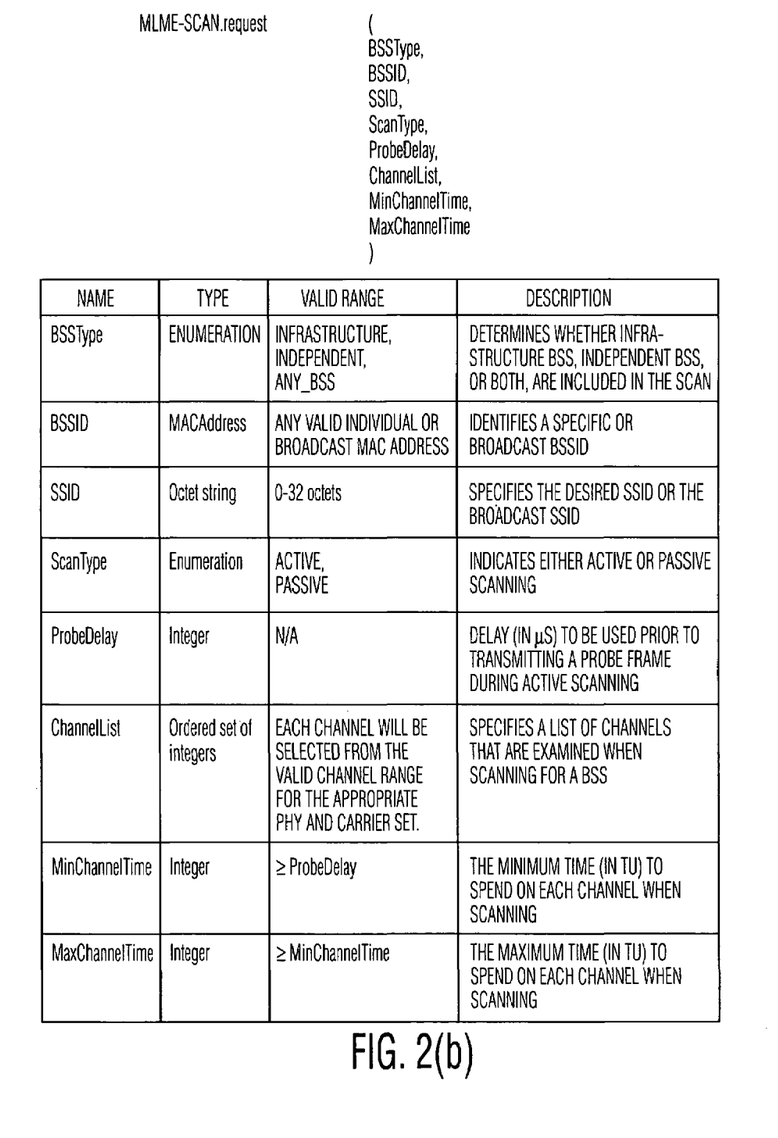
FIG. 2(b) illustrates scan service parameters according to the IEEE 802.11 standard.

FIG. 2(a) illustrates the architectural view of the medium access control (MAC) of the data link layer and the PHY layer, representing the IEEE 802.11 standard. FIG. 2(b) illustrates the scan service parameters (explained later) according to the IEE 802.11 standard.

Figure 3:
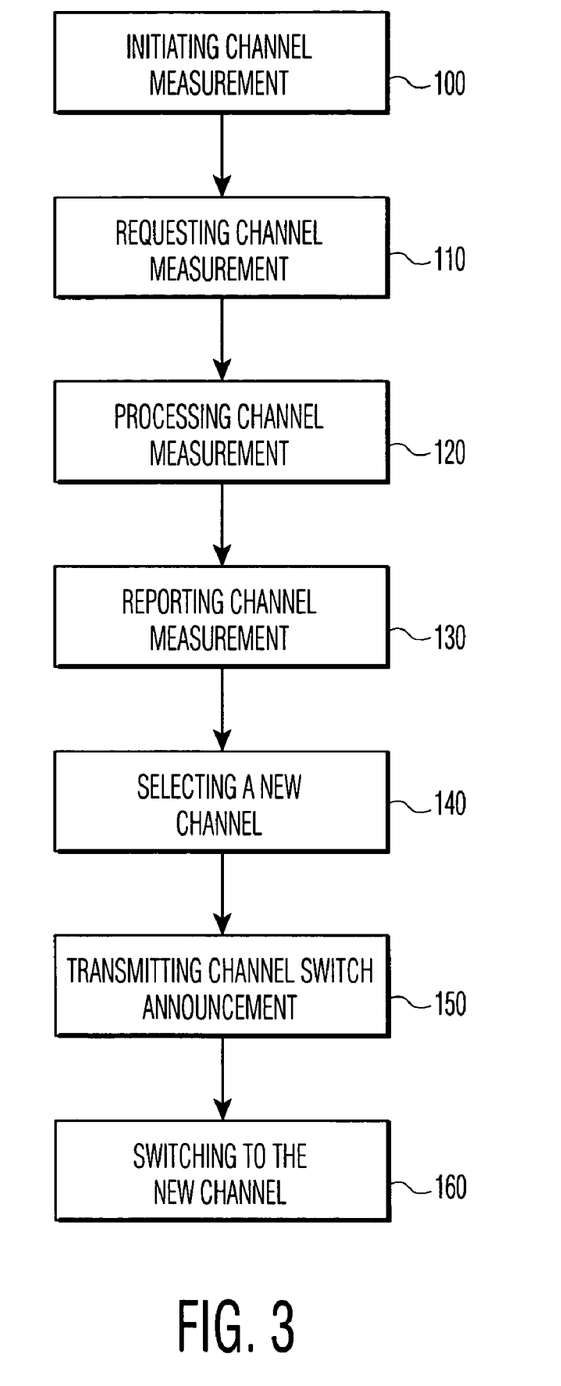
FIG. 3 is a flow chart illustrating the operation steps for selectively switching to a new channel according to an embodiment of the present invention.

Referring now to FIGS. 3–8, and in particular to FIG. 3, the principle of operation steps according to the present invention in selecting a new channel for all stations (STAs) by the AP is explained hereafter. The inventive steps include the following steps: initiating channel measurement 100; requesting channel measurement 110; processing channel measurement 120; reporting channel measurement 130; selecting a new channel 140; transmitting channel switch announcement 150; and, switching to the selected channel 160. A detailed description of selecting a new channel and switching all the stations (STAs) in the BSS to the selected channel based on the channel measurement received from the STAs associated with a particular BSS and/or its own channel measurement by the AP is described in greater detail below with reference to FIG. 3 through FIG. 8.

Initiating Channel Measurement (Step 100 of FIG. 3)

Figure 4:
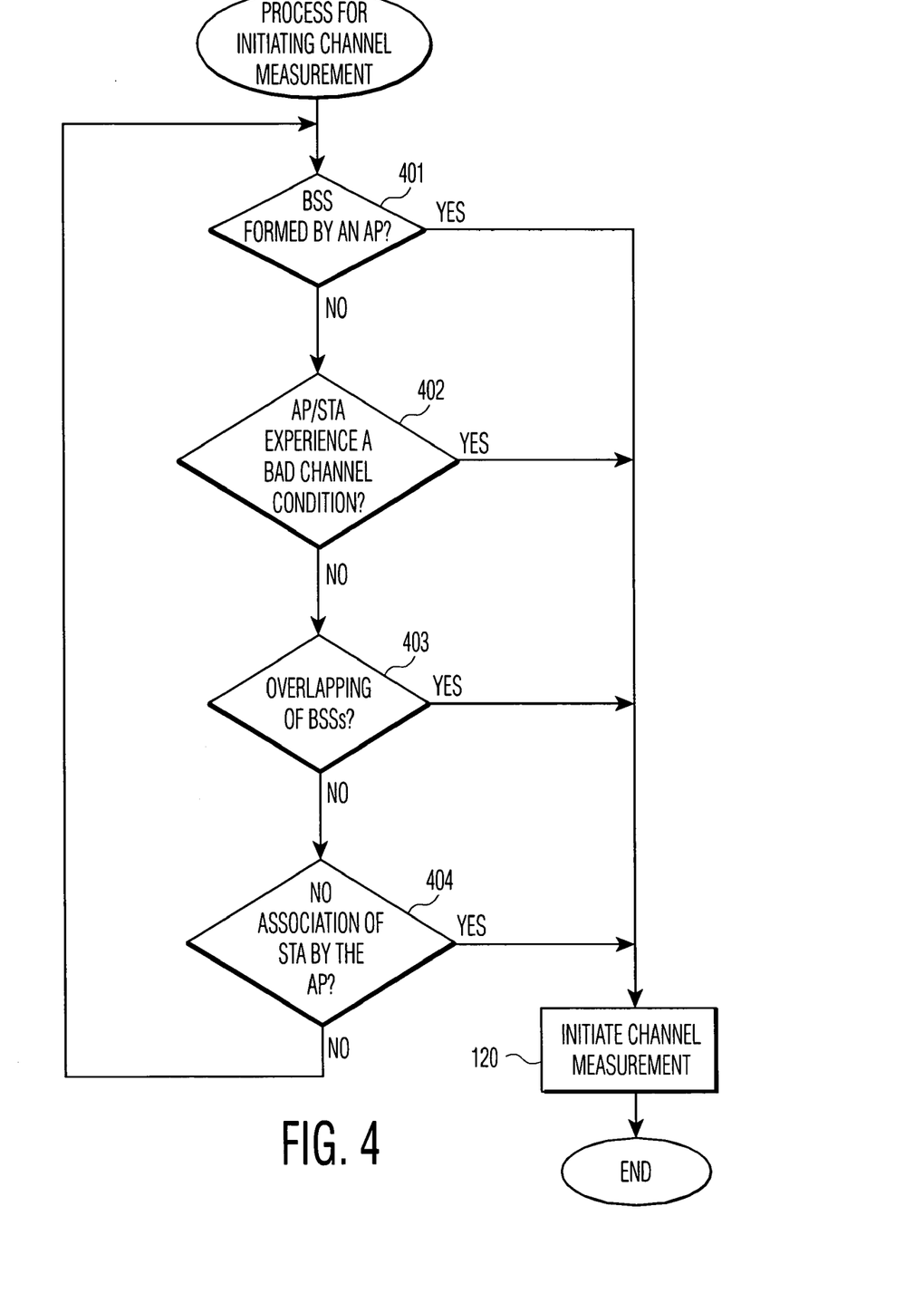
FIG. 4 is a flow chart illustrating the process of initiating the channel measurement according to an embodiment of the present invention.

FIG. 4 is a flow chart illustrating the initiation procedure according to the present invention, wherein the channel quality measurement is initiated if one of the following, but not necessarily limited to, events occurs: (1) a particular basic-service-set (BSS) is newly formed by an AP (step 401); (2) the AP and/or one or more STAs in a BSS experiences a poor communication channel persistently; (3) overlapping of BSSs occurs causing a channel interference; and, (4) the AP operates a given BSS without any associated STA for a certain period of time. If any of these events occurs, the AP dynamically selects a new wireless link to operate its BSS. To accomplish this process, the AP first determines the status of the current channel as well as other channels, by detecting the channel conditions directly or by requesting the channel conditions from the associated STAs.

Requesting Channel Measurement (Step 110 of FIG. 3)

Figure 5A:
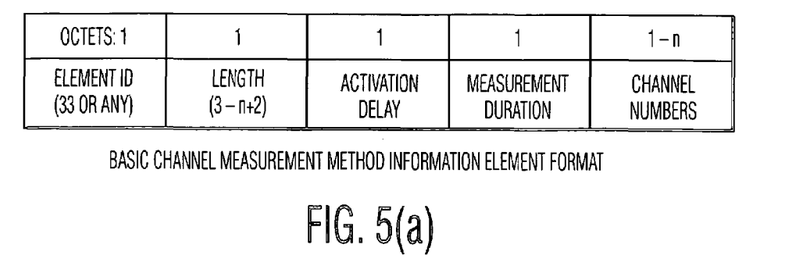
FIG. 5 illustrates the format of a frame body that is used to transmit information from an access point to the stations according to an embodiment of the present invention.
Figure 5B:
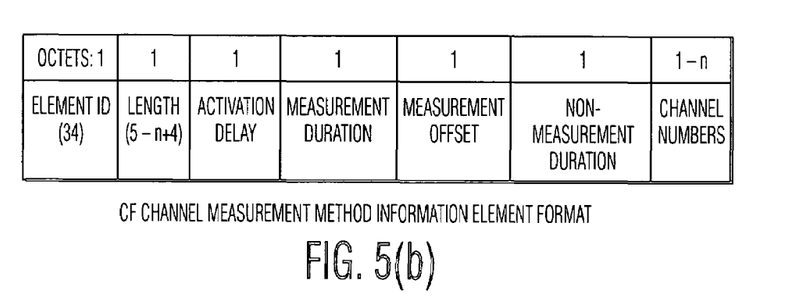

A management frame is transmitted by the AP to request a channel quality measurement to a set of stations (STAs) associated with its BSS. It should be noted that if the channel selection process has been initiated due to the start of a new BSS, the AP does not have to make such a request. The transmission of a request for channel quality measurement to the stations (STAs) can be unicast, multicast, or broadcast. FIG. 5(a) and FIG. 5(b) illustrate the frame body of two types of management frames, namely the "basic channel measurement frame" and the "CF channel measurement frame," that can be used by the AP in requesting the channel quality measurement to the stations (STAs) in accordance with the present invention. These frames specify (1) when to begin the measurement; (2) which channel to measure; (3) how long to measure; and, (4) how to measure.

Referring to FIG. 5(a), the basic channel measurement frame contains three fields: "Activation Delay," "Measurement Duration," and "Channel Numbers." The "Activation Delay" field specifies when to start the channel measurement procedure. The "Measurement Duration" ($\geq 0$) field indicates the duration of each channel measurement performed by the requested STA. The "Channel Number" field indicates a set of channels to be measured, in which each octet specifies a channel number.

Referring to FIG. 5(b), the CF Channel Measurement frame contains four fields: "Measurement Duration," "Measurement Offset," "Non-Measurement Duration," and "Channel Numbers." The "Activation Delay" field specifies when to start the channel measurement procedure. The "Measurement Duration" ($\geq 0$) field indicates the time duration, in the number of contention free period (CFP) repetition intervals (CFPRI's), which the requested STA spends for the measurement of each channel. The "Measurement Offset" and the "Non-Measurement Duration" fields represent the time period out of each CFPRI, which the requested STA should not be away from the current channel for the measurement of a remote channel. For example, during a CFPRI[0, CFPRI], starting from the target beacon transmission time (TBTT), at which a CFP starts, the STA is to be away from the current channel for the measurement of a remote channel, except for the period [CFPRI*MO/256, CFPRI*(MO+NMD)/256], where MO represents the value of "Measurement Offset," and NMD represents the value of "Non-Measurement Duration," respectively. The "Channel Number" field indicates a set of channels to be measured, in which each octet specifies a channel number.

Processing Channel Measurement (Step 120 of FIG. 3)

Figure 6A:
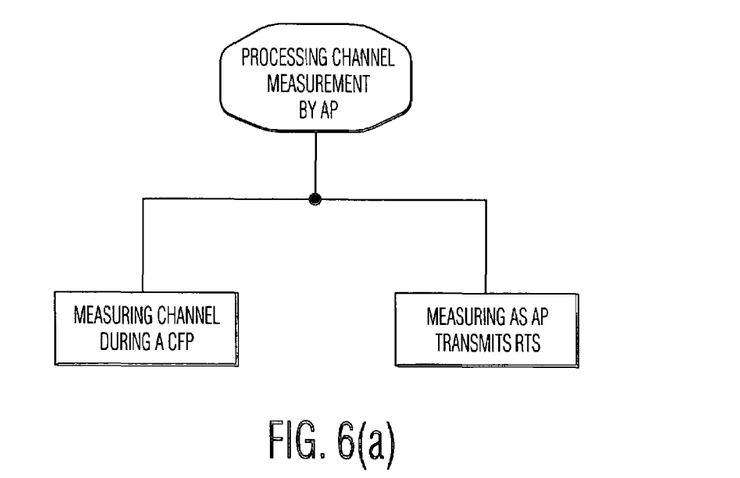
FIG. 6(a) illustrates the process of measuring the channel condition by the access point according to an embodiment of the present invention.

The measurement of a channel quality is performed by both the AP and non-AP STA. Referring to FIG. 6(*a*), the AP measures the channel condition preferably during a contention free period (CFP) or in a contention period. A service disruption in a contention period could be minimized by sending an RTS frame. The AP typically receives signals, unless it is transmitting a signal. Thus, the service disruption can be avoided if the channel quality measurement of the current channel and/or other channels is performed during a contention-free period (CFP). Alternatively, the AP could measure the channel after sending a Request-to-Send (RTS) frame. By sending an RTS frame with an invalid receiver address (RA), the AP could force all the STAs, which receive this RTS frame, to stop transmitting signals for a specified period. Then, during this specified period, the AP can measure the channel condition without a service interruption.

Figure 6B:
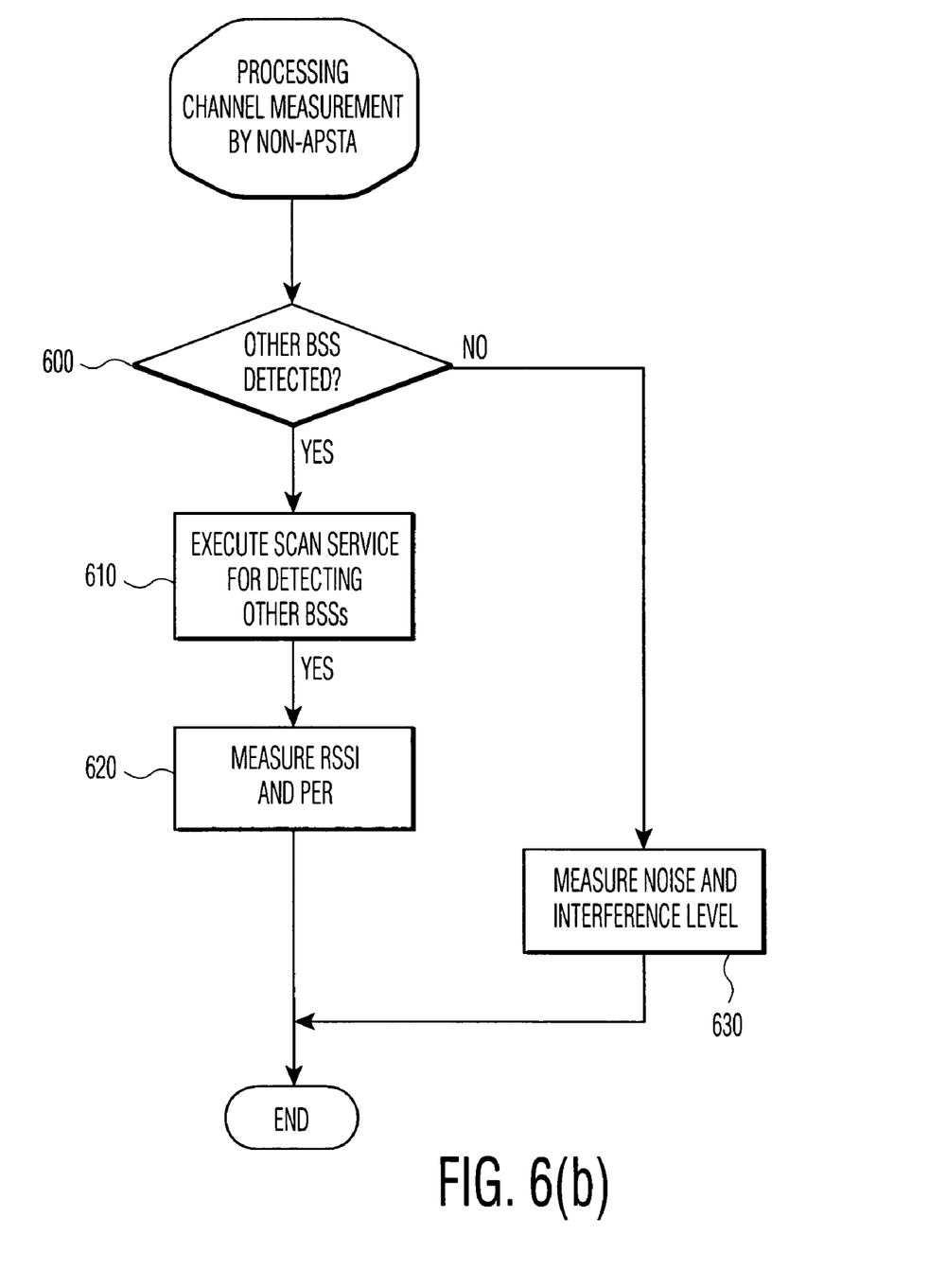
FIG. 6(b) is a flow chart illustrating the process of measuring the channel condition by the non-AP station according to an embodiment of the present invention.

Referring to FIG. 6(*b*), the channel quality measurement by the non-AP STAs is performed simultaneously in two different ways. The first one is a detection of existing BSS in the channel, and the measurement of the interference from the identified BSS if any. Referring to FIG. 2(*a*) and FIG. 2(*b*), the existing MAC sublayer management entity (MLME) service known as "scan" service is used for the purpose of detecting other BSS in the present invention. This service is requested by the station management entity (SME) residing within each STA to the MLME via a management primitive MLME-SCAN.request in order to request the detection of existing BSSs in a number of channels. A number of primitive parameters for MLME-SCAN.request is defined as shown in FIG. 2(*b*) and include: ScanType for indicating either active (the STA sends a probe frame and expects a response from a BSS) or passive (the STA simply listens to the channel, trying to detect some frames) scanning; ProbeDelay for indicating the delay (in $\mu$s) to be used prior to transmitting a Probe frame during active scanning; ChannelList for indicating a list of channels to examine; MinChannelTime for indicating the minimum time to spend on each channel; and, MaxChannelTime for indicating the maximum time to spend on each channel. Thereafter, the primitive MLME-SCAN.confirm returns the scan results back to the SME, including the complete description of all the BSSs found. It is noted that this service is originally defined in the 802.11 in order for a STA to survey potential BSSs that the STA may later elect to perform the handoff.

After detecting the presence of other BSSs (at step 610), a further analysis of the channel condition (at step 620) is performed to obtain a channel to run a BSS. In particular, it is determined how busy the channel is and how close the stations (STAs) of other BSSs are to the STA, which was requested to measure the channel condition. In the embodiment, the measurements of the strength of the received signal to determine the channel condition. The 802.11 PHYs define a parameter called received signal strength indicator (RSSI), which ranges from 0 through the RSSI maximum. This parameter is measured by the PHY layer and indicates the energy level observed at the antenna that is used to receive the current PLCP Protocol Data Unit (PPDU). The RSSI is measured during the reception of the PLCP preamble. In addition, the RSSI information could also be used to indicate how close the STA that was requested to measure the channel condition is from the STAs of other BSSs.

Furthermore, a packet error rate (PER) could be used in combination with the RSSI measurement to determine the status of the channel condition according to the present invention. The PER can be measured from the frame reception statistics which define the number of frames received; the number of frames received in error (e.g., FCS errors); and, the ratio of the busy period over the total measurement period. The packet error rate (PER) is calculated by dividing the number of frames received in error by the total number of frames received.

Referring back to FIG. 6(*b*), the second type of measurement is the measurement of noise or interference level by an 802.11 non-compliant device is performed. For example, the channel measuring STA may detect another STA, which follows different standards, for example, an ETSI BRAN H/2 standard, that is running in the same channel. The existence of such a device is detectable not as a BSS, but as a co-channel interference. In the embodiment, the measurement of the time portion when the channel stays busy, without receiving any 802.11 frames, is used to determine whether a non-802.11 device is up and running in a specific channel and how bad the channel is due to non-identifiable interference sources. That is, using existing parameters available in the current 802.11 PHY, the present invention can derive a mechanism to determine the presence of a non-compliant device.

Figure 6C:
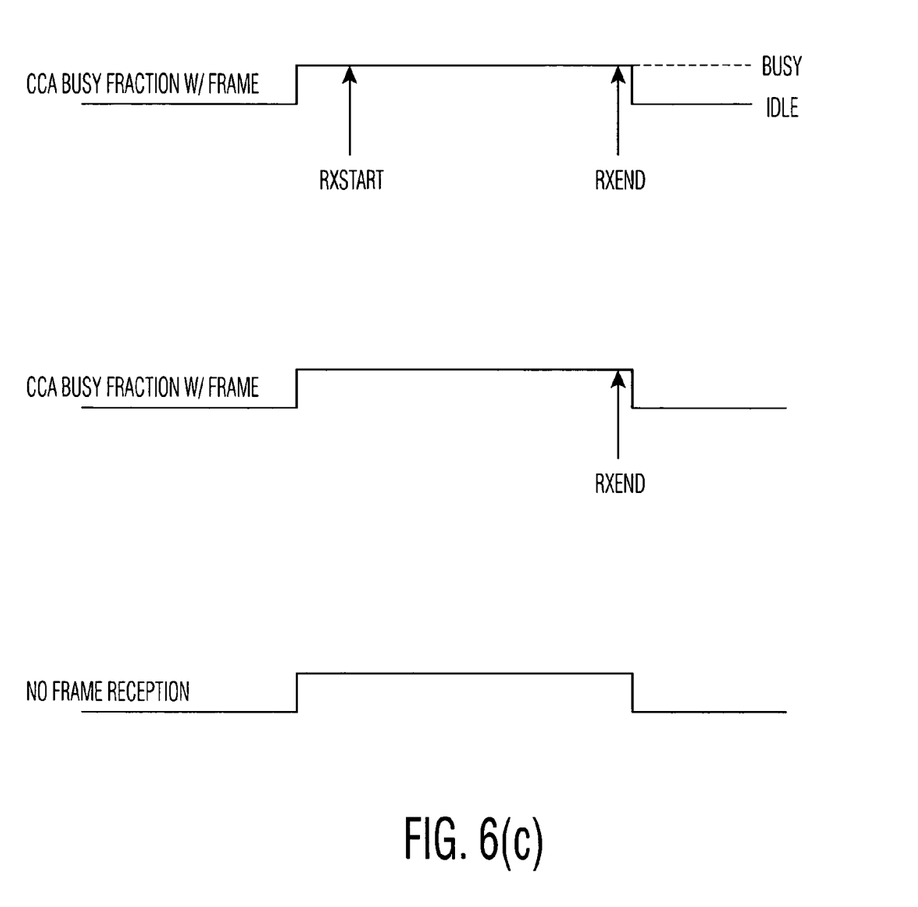
FIG. 6(c) illustrate different frame reception scenarios to determine a non-compliance device according to an embodiment of the present invention.

Referring to FIG. 6(*c*), the mechanism of detecting non-compliant 802.11 device according to the present invention, without changing the physical layer (PHY) specification of IEEE 802.11 WLAN is illustrated. If there exists an interfering non-802.11 (or alien) device in a channel, the channel measuring STA will not be able to receive the signals from the device correctly, so the RSSI will not be reported to the MAC layer, as in the first method. However, if the signal power from the alien device is higher than a threshold (i.e., PHY MIB dot11EDThreshold (for 802.11b) or dot11T1Threshold (for 802.11a), the channel is indicated as BUSY to the MAC layer via the PHY-CCA.indication (BUSY) parameter under the existing 802.11 PHY layer standard. Hence, the measurement of the time period when the channel stays busy, without receiving any meaningful MAC frames (indicated by PHY-RXSTART.indicate and PHY-RXEND.indicate), would be a mechanism to determine whether a non-802.11 device running in a specific channel. To achieve this, the AP needs to specify how long the requested STA will spend on each channel, which is specified as part of the "scan" process previously. FIG. 6(*c*) represent a set of three different scenarios where the number of CCA busy indications can be obtained, without receiving any meaningful MAC frame. FIG. 6(*c*) represents the reception of both PHY-RXSTART.indicate and PHY-RXEND.indicate from the PHY layer to indicate that the channel is busy without receiving any MAC frames. FIG. 6(*c*) represents scenarios where only PHY-RXSTART.indicate is received from the PHY layer. There are two cases when PHY-RXSTART.indicate is not issued even though a valid PLCP preamble/header is received: one is when the rate used for the transmission of the MAC frame (or MPDU) is not supported, and the other is when the format of the PLCP header is incorrect. In these cases, although the PHY-RXSTART.indicate will not be issued, theCCA.ind (BUSY) will last until the time duration indicated by the LENGTH field of PLCP header. Thereafter, PHY_RXEND.indicate (RXERROR) is issued to indicate the type of the error. FIG. 6(*c*) represents scenarios when the CCA.ind (BUSY) is indicated without receiving neither PHY_RXSTART.indicate (RXVECTOR) nor the PHY_RXEND.indicate (RXERROR) frame. In the embodiment, when no frame receptions occurs, it is construed as the presence of non-compliance device to the AP.

Reporting Channel Measurement (Step 130 of FIG. 3)

After the completion of a channel quality measurement, the STA that was requested to measure the channel(s) reports back to the AP. The report will include all three parts of the measurements described in the previous paragraphs. Those include (1) the parameters of SCAN.confirm; (2) the measured values of RSSI and PER for the channels; and, (3) the measurement of noise/interference by the non-802.11 device. This report may be transmitted upon being polled by the AP during a contention-free period (CFP) or during the contention period (CP).

Figure 7A:
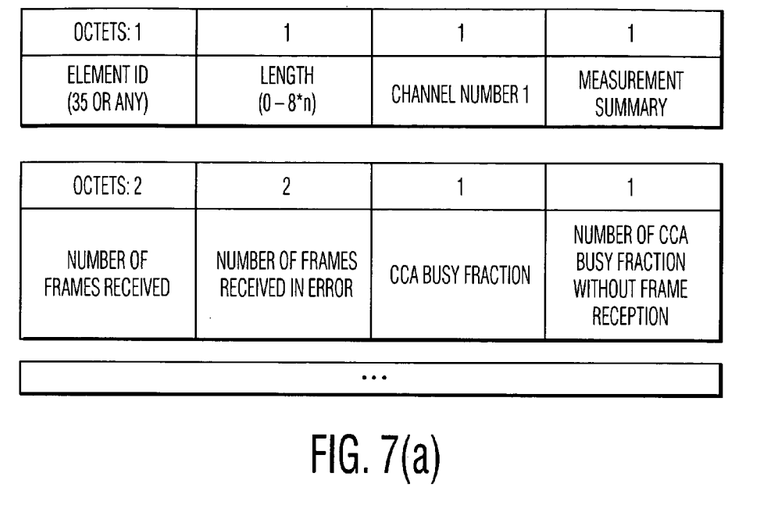
FIG. 7 illustrates the format of a frame body that is used to transmit information from a plurality of stations to the access point according to an embodiment of the present invention; and, FIG. 8 illustrates the format of a frame body that is used to transmit announcement data from an access point to a plurality of stations according to an embodiment of the present invention.
Figure 7B:
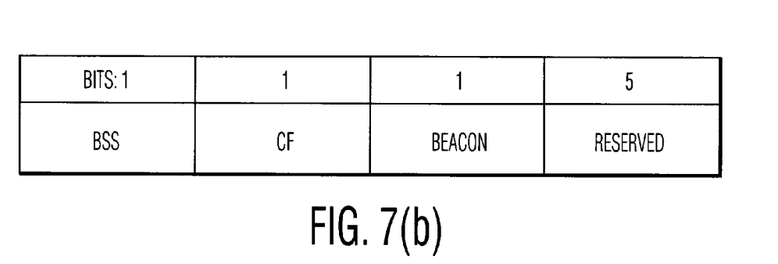

FIG. 7(a) illustrates the format of a management frame body that is used by an STA to report the channel quality measurement back to the AP in accordance with the present invention. As shown in FIG. 7(a), the length of the frame depends on the number of channels. A one-octet "Measurement Summary" field detailed in FIG. 7 (b) includes a BSS field for specifying that at least one valid MAC Header was received during the channel measurement; a CF field for specifying that at least one of the BSS(s) detected is running PCF; and, a Beacon field for specifying that at least one beacon was received during the measurement. The rest of the fields in the element are defined as follows: the "Number of frames received" field for specifying the total number of frames received during the measurement in the channel; the "Number of frames received in error" field for specifying the total number of frames received in error during the measurement in the channel; and, the "CCA Busy Fraction" field for specifying the fractional time during which the CCA was busy, which is calculated according to the following equation: CCA Busy Fraction=Ceiling (255×[CCA Busy Period]/[Total Measurement Duration in the Channel]). Finally, the "CCA Busy Fraction without Frame Reception" field indicates the fractional time during which the CCA was busy without receiving an 802.11 frame, which is calculated according to the following equation: CCA Busy Fraction without Frame Reception=Ceiling (255×[CCA Busy Period without 802.11 Frame Reception]/[Total Measurement Duration in the Channel]).

Selecting a New Channel (Step 140 of FIG. 3)

Upon receiving the channel quality report from the STAs, it is determined, by the AP, whether to switch the current channel or not. In order to determine whether to make a switch, the AP compares the status of other channels with that of the current channel in order to select a new channel, based on the criteria implemented in the AP. It should be noted that the decision to switch out of the current channel is implementation-dependent. Thus, various modifications readily apparent to those skilled in the art can be used.

Transmitting Channel Switch Announcement (Step 150 of FIG. 3)

Figure 8:
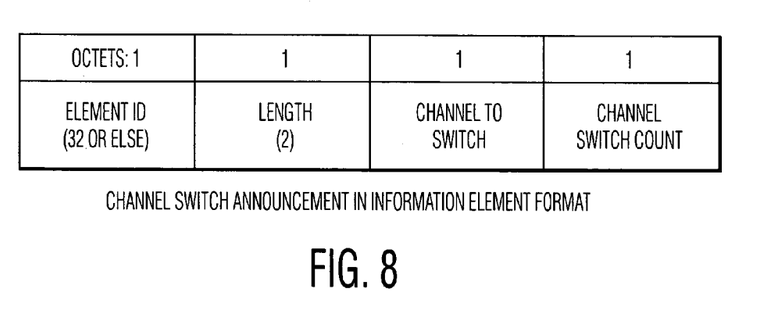

Once the AP determines a new channel, the AP transmits the new channel information to every STA within the BSS. FIG. 8 depicts an announcement element that can be used in the existing beacon frame, as set forth in the IEEE 802.11 standard. That is, the frame depicted in FIG. 8 is realized by newly defining the existing beacon frame under the IEEE 802.11 standard. The Channel Switch Announcement beacon frame in accordance with the present invention contains two fields: "Channel-to-Switch" and "Channel Switch Count." The "Channel-to-Switch" field indicates the number of the frequency channels to make the switch to. The "Channel Switch Count" field indicates how many beacons (including the current frame) should appear before the channel switch when the BSS occurs.

Switching to the New Channel (Step 160 of FIG. 3)

Finally, the movement into a new channel is performed by changing the carrier frequency (or frequencies in case of a 802.11a OFDM PHY). In the embodiment, the switching is preferably to occur during a target beacon transmission time (TBTT).

As is apparent from the foregoing, the present invention has an advantage in that a dynamic channel selection (DCS) mechanism can be obtained with some minor modification in the current 802.11 specifications, without requiring any change in the underlying PHY specifications of IEEE 802.11 WLAN standard.

Having thus described a preferred embodiment of a dynamic channel selection (DCS) method for determining a channel for use within a WLAN system, it should be apparent to those skilled in the art that certain advantages of the system have been achieved. The foregoing is to be constructed as only being an illustrative embodiment of this invention. Persons skilled in the art can easily conceive of alternative arrangements providing a functionality similar to this embodiment without any deviation from the fundamental principles or the scope of this invention.

What is claimed is:

1. A method for dynamically selecting a communication channel between an access point (AP) and a plurality of stations (STAs) located within the coverage area of a basic service set (BSS) in a wireless local area network (WLAN), the method comprising the steps of:
   (a) determining whether a new channel to be used by said plurality of wireless stations is needed;
   (b) requesting, by said AP, a channel signal quality measure to at least one of said plurality of stations;
   (c) scanning a set of channels available for use by said plurality of stations to determine whether a signal from an adjacent BSS is received;
   (d) if said adjacent BSS signal is detected, determining a signal quality measure of each channel of said set of channels based on a received signal strength indication (RSSI) and a packet error rate (PER) of all said channels measured by said plurality of stations to said AP; and,
   (e) selecting said new channel based on said measured RSSI and said PER information.

2. The method of claim 1, further comprising the step of communicating information about said new channel from said AP to said plurality of stations.

3. The method of claim 1, further comprising the step of establishing communication to said new channel between said AP and said plurality of stations.

4. The method of claim 1, wherein said channel signal quality report further includes an interference signal level caused by another communication device, said interference signal level is based on the absence of any 802.11 frame reception.

5. The method of claim 1, wherein said RSSI and said PER is used to determine said channel signal quality and a relative distance between the STA requested for said channel signal quality measure and a plurality of adjacent stations from said adjacent BSS.

6. The method of claim 1, further comprising the steps of:
   detecting a channel signal quality from the set of said channels by said AP; determining a candidate channel for use in communication between said AP and said plurality of stations; and, switching to said candidate channel if the detected channel signal quality exceeds a predetermined threshold.

7. The method of claim 6, wherein said AP measures said channel signal quality during a contention-free-period (CFP).

8. The method of claim 6, wherein said AP measures said channel signal quality after transmitting request-to-send (RTS) frame.

9. The method of claim 1, wherein it is determined that said new channel is needed in step (a) if one of the following conditions occurs:
  (1) said BSS is formed by said AP;
  (2) said AP or said STA experiences a bad channel condition;
  (3) said BSS overlaps with an adjacent BSS; and,
  (4) no association of said STA by said AP occurs longer than a predetermined time period.

10. A method for dynamically selecting a communication channel between an access point (AP) and a plurality of stations (STAs) located within the coverage area of a basic service set (BSS) in a wireless local area network (WLAN), the method comprising the steps of:
  (a) determining whether a new channel to be used by said plurality of wireless stations is needed;
  (b) requesting, by said AP, a channel signal quality measure to each of said plurality of stations;
  (c) scanning a set of channels available for use by said plurality of stations to determine whether a signal from an adjacent BSS is received; and,
  (c) (i) if detected, measuring a received signal strength indication (RSSI) and a packet error rate (PER) of all said channels scanned by said plurality of stations to said AP;
  (c) (ii) if not detected, measuring an interference level caused by another communication system based on the absence of any 802.11 frame reception for a predetermined time period; and,
  (d) selecting said new channel representing the least interference signal level based on said measured RSSI, PER, and interference level.

11. The method of claim 10, further comprising the step of communicating information about said new channel from said AP to said plurality of stations.

12. The method of claim 10, further comprising the step of establishing communication to said new channel between said AP and said plurality of stations.

13. The method of claim 10, further comprising the steps of:
  detecting a channel signal quality from the set of said channels by said AP; determining a candidate channel for use in communication between said AP and said plurality of stations; and,
  switching to said candidate channel if the detected channel signal quality exceeds a predetermined threshold.

14. The method of claim 13, wherein said AP measures said channel signal quality during a contention-free-period (CFP).

15. The method of claim 13, wherein said AP measures said channel signal quality after transmitting request-to-send (RTS) frame.

16. The method of claim 13, wherein determining that said new channel is needed in step (a) if one of the following condition occurs:
  (1) said BBS is formed by said AP;
  (2) said AP or said STA experiences a bad channel condition;
  (3) said BSS overlaps with an adjacent BBS; and,
  (4) no association of said STA by said AP occurs longer than a predetermined time period.

* * * * *